Oct. 8, 1935.   R. THOMAS   2,016,691
APPARATUS FOR DOUBLE SIMULTANEOUS PROJECTION
Filed July 9, 1934
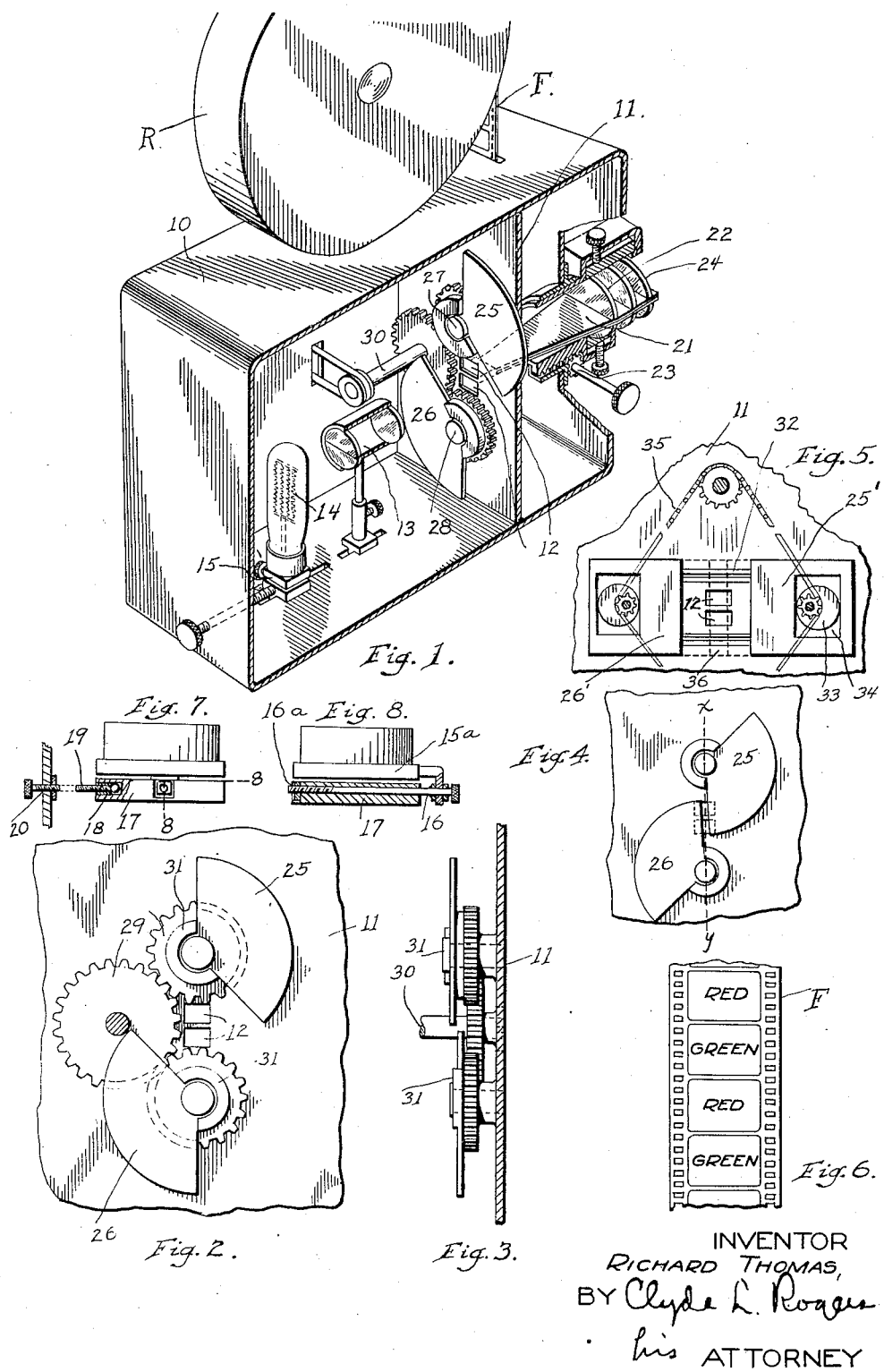
INVENTOR
RICHARD THOMAS,
BY Clyde L. Rogers
his ATTORNEY Patented Oct. 8, 1935

2,016,691

UNITED STATES PATENT OFFICE 2,016,691

APPARATUS FOR DOUBLE SIMULTANEOUS PROJECTION

Richard Thomas, Los Angeles, Calif., assignor of one-half to William Jennings Bryan, Jr., Los Angeles, Calif.

Application July 9, 1934, Serial No. 734,359

1 Claim. (Cl. 88—16.4)

This invention relates to the double simultaneous projection of motion pictures from a film, and more particularly to the art of projecting color photographic images. It has to do more especially with those systems of additive color wherein a projector is used having two light apertures through which adjacent frames of film of different color values are simultaneously projected, and which are provided with double lenses by which the images from the two frames are focused upon a screen in superimposed relation. In such a system it is generally convenient to employ red and green filters as the primary colors from which the color records are obtained, and a color value film of the character indicated in Fig. 6 is employed. This film is photographed through the pair of color filters in such a manner that one frame will be a record of the color values taken through the red color filter and the succeeding frame will be a record of the color values taken through the green color filter; the alternate frames of the film constituting color values red and green.

In such a system where conventional shutters are used consisting of segmental wings disposed in diametrically opposed relationship upon an axis and merely passing across the optical axes of the projection lenses, an objectionable pulsating or color beat is created which greatly detracts from the color value of the composite image upon the screen. This objectionable result I have found to be due largely (1) to the positioning of the shutters so that the blades thereof cut off one image at a time instead of cutting off both equally and simultaneously and (2) to insufficient speed in the opening and closing of the shutters.

Attempts have been made hitherto to remedy this objectionable result by the use of a pair of shutters provided with double segmental wings disposed in diametrically opposed relationship upon a shaft and turning in opposite directions, the two shutters being duplicates. Such double opposed shutters are objectionable in that they of necessity materially reduce the amount of light passing through the projector lenses to the screen, thus detracting from the natural coloring effects of the system.

A principal object of the invention is to provide an improved shutter mechanism for motion picture projection machines having double lenses disposed side by side, in which double, opposed shutters are disposed with reference to the medial line of the lenses in such a manner as to cut off both images equally and simultaneously with respect to the medial line of such images. This is of value and importance for largely eliminating pulsations of color, or color beat, as usually experienced; a further object is to provide an improved shutter system for the uses stated, in which two single segmental wings move in opposite directions giving a rapid opening and closing without reducing the amount of light passing through the projector. A still further object is to provide means for accurately adjusting and positioning a light source with reference to the lenses and exposure apertures of a motion picture projection machine having double lenses disposed side by side, so that most efficient projection is attained.

The foregoing and other objects and advantages of the invention will be better understood from the following detailed description and the distinctive features of novelty will thereafter be pointed out in the appended claim.

Referring to the drawing;

Figure 1 is a perspective view with portions broken away, of an apparatus embodying the invention.

Figure 2 is a relatively enlarged fragmentary elevation showing the arrangement of the cooperative shutter wings with reference to the light apertures.

Figure 3 is a side view thereof with the mounting wall shown in section.

Figure 4 is a partial elevation of the shutter wings showing the manner of their cooperation in controlling the light apertures.

Figure 5 is a fragmentary elevation illustrating a modified form of shutter members.

Figure 6 is a fragmentary elevation showing a portion of film adapted for use with the invention.

Figure 7 is a fragmentary elevation and section on a larger scale showing the adjustment of the light source; and, Figure 8 is a similar view partly in section on line 8—8 of Fig. 7 showing further the adjustment of the light source.

10 indicates the housing of the apparatus having fixed therein at an intermediate point a dividing wall or partition 11. This partition has two adjacent light apertures 12 therein to constitute the exposure station for the film F which is drawn from a suitably mounted roll R. The wall 11 thus constitutes a double aperture plate for the film. 13 indicates a condenser unit equipped with suitable lenses for condensing and concentrating the light from a light source 14 upon the apertures 12. In accordance with my invention the light source 14 is mounted for accurate adjustment and positioning with respect to the condenser unit 13. For this purpose the socket 15 of the light 14 has the base portion 15a thereof engaged by a transverse adjusting screw 16 which is threaded as indicated at 16a in a nut secured in a base member 17. The base member 17 in turn has swiveled therein as indicated at 18 the end of an adjusting screw 19, which is threaded in a nut formation 20 of the housing 10. The screws 16 and 19 are equipped with suitable knurled heads and by adjusting the same the light source 14 may be positioned with entire accuracy for best results with respect to the condenser unit 13. 21 denotes a septum member which extends forwardly from the dividing rib between the apertures 12 to the projector unit 22. This projector unit comprises suitable projecting lenses suitably mounted in a barrel housing that is adjustable by suitable means shown as a rack and pinion adjustment 23, in the housing 10. Incorporated in the apparatus and as shown mounted at the front of the projector unit 22 is a color screen unit 24 for determining the color values to be projected.

In accordance with my invention quick acting and oppositely disposed shutter members are mounted to control the light apertures 12, these shutter members moving symmetrically inward and outward with respect to the medial line of the film apertures 12, and thus also symmetrically with respect to the medial line of the image frames exposed on the film. In the form shown in Fig. 1 these shutter members comprise single segmental blades 25, 26 mounted on shafts 27, 28 located in the projection of the medial line of the film apertures. These blades are geared together through an intermediate gear as indicated at 29 so that they operate synchronously. Power impulse for operating these shutters is derived from a suitably driven shaft 30 on which the intermediate gear is fixed. The shutter members 25, 26 preferably have suitable counterbalancing means 31 associated therewith so that they operate most freely and easily. With reference to Fig. 4 it will be noted that the advance edges of these shutter blades cut in from opposite sides of the film apertures substantially symmetrically with respect to the medial line $x$—$y$ of the film apertures, and that thus the light values transmitted, and hence ultimately the color values projected will continue to bear the same relation to one another progressively as the light is shut off, as they do when the apertures are fully opened. The same is true of the rear edges of the shutter blades on the opening of the apertures. In Fig. 5 I show a form of the invention where the shutter members 25 and 26 which control the light apertures 12 instead of being mounted to rotate are mounted to slide on ways 32 of the partition wall 11. Suitable means is provided for causing these shutter plates 25', 26' to move symmetrically and synchronously with respect to the medial line of the film apertures. Such means may assume various forms, but in the present instance I show eccentrics 33 engaged in openings 34 in the rear portions of the shutter plates. These may be connected for simultaneous and synchronous operation by a chain and sprocket device 35. The range of movement of the shutter plates is preferably such that when moved fully inward they overlap somewhat as indicated at 36. It will be noted that here the advance portions of the shutter plates operate in precise symmetry and synchronism with respect to the medial line of the film apertures. As before stated the invention is of particular and distinctive value for use with a color value film having different color values in alternation thereon as indicated by the terms "red" and "green" in Fig. 6. Since in each of the described forms the light is cut off and admitted to both of the film apertures equally and simultaneously, and symmetrically with respect to the medial line of such apertures, the objectionable pulsating or color beat usually experienced is greatly reduced. Also as compared with previous types, such as a four blade shutter, the cutoff and admission of light is much speeded up since it will be understood that with such a four blade shutter it will be rotated at a reduced speed, thus causing a shadow due to the lag in cut-off. With the two blade shutter of the present invention, i. e., a single blade on each shutter member, the cut-off and admission movement is speeded up materially. It will be understood that by the use of cooperative shutter members with a single blade each, it is possible to operate the same at a double speed as compared with a type wherein the shutter members have two blades each,—or to obtain twice the light capacity with a like speed. The greatly accelerated cut-off, thus obtainable, results in less visible flicker.

I am aware that the invention may be embodied in other specific forms without departing from the spirit or essential attributes thereof, and I therefore desire the present embodiments to be considered in all respects as illustrative and not restrictive, reference being had to the appended claim rather than to the foregoing description to indicate the scope of the invention.

Having described my invention, what I claim as new and desire to secure by Letters Patent is:

In a color motion picture projection apparatus, the combination with a double aperture plate, means for intermittently feeding a color record film in front thereof, a light source, a condenser for concentrating light upon such apertures, a projection unit having two segmental lenses arranged one above the other in the direction of the film feed, a septum extending between the lens units and to the aperture plate, and a shutter device embodying two oppositely revoluble members mounted on parallel axes on opposite sides of the plate, each having a single blade and advance edge, arranged so that such advance edges move symmetrically and equally toward the medial line of such apertures and transversely to the plane of the septum to control passage of light therethrough, and means to move the shutter members.

RICHARD THOMAS.